(No Model.)
S. P. FORD.
GRAIN ELEVATING AND MEASURING MACHINE.
No. 471,965. Patented Mar. 29, 1892.
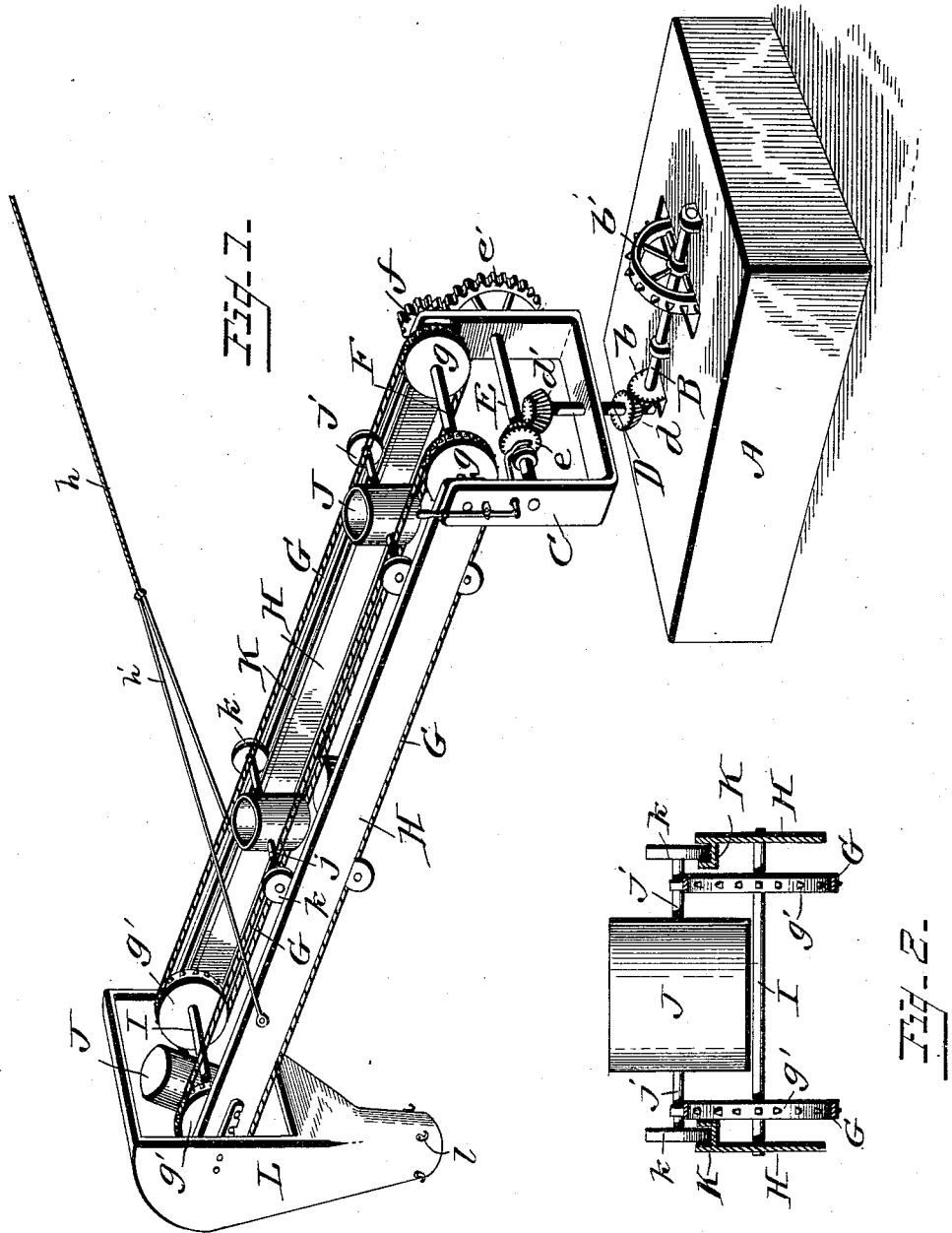
Witnesses
Albert Speiden.
Van Buren Hillyard.
Inventor
Simon P. Ford.
By his Attorneys

UNITED STATES PATENT OFFICE.

SIMON PETER FORD, OF MORRISONVILLE, ILLINOIS.

GRAIN ELEVATING AND MEASURING MACHINE.

SPECIFICATION forming part of Letters Patent No. 471,965, dated March 29, 1892.

Application filed September 12, 1891. Serial No. 405,495. (No model.)

*To all whom it may concern:*

Be it known that I, SIMON PETER FORD, a citizen of the United States, residing at Morrisonville, in the county of Christian and State of Illinois, have invented certain new and useful Improvements in Grain Elevating and Measuring Machines; and I do hereby declare the following to be a full, clear, and exact description of the invention, such as will enable others skilled in the art to which it appertains to make and use the same.

This invention relates to grain elevating and measuring machines.

The purpose of the invention is to convey the grain from a thrashing-machine to a convenient point for sacking and at the same time measure off a given quantity.

The nature of the invention consists in the novel features and the peculiar construction and combination of the parts, which will be hereinafter more fully described and claimed, and which are shown in the annexed drawings, in which—

Figure 1 is a perspective view of a grain elevating and measuring machine. Fig. 2 is a cross-section of the elevator-frame.

The base A may be of suitable construction to support the operating parts of the machine. The shaft B, journaled on the base, is provided at one end with the drive-pulley $b'$, which receives its motion from any convenient part of the thrasher-operating mechanism and with the beveled pinion $b$ at its opposite end. The vertical shaft D, journaled to the base, is provided at its lower end with the beveled pinion $d$, which meshes with the bevel-pinion $b$, and at its upper end with the bevel-pinion $d'$ which meshes with a corresponding bevel-pinion $e$ on the horizontal shaft E, which is journaled in a yoke or U-frame C, that is mounted on the shaft D to swing loosely thereon from right to left. The horizontal shaft F, having bearings at its ends in the yoke or U-frame, is driven from the shaft E by the pinion $f$ on the end of the shaft F, meshing with the gear-wheel $e'$ on the shaft E. The elevator-frame H is mounted on the shaft F and turns on the same when its outer or free end is raised or lowered. Suitable means are provided to adjust and hold the elevator-frame H in the proper or desired position, as the rope $h$ and the bail $h'$.

This rope $h$ will be operated from the thrasher in the usual manner. The endless chains G comprising the elevator pass around sprocket-wheels $g$ $g$ and $g'$ $g'$ at opposite ends of the frame H. The sprocket-wheels $g$ $g$ are mounted on the shaft F, and the sprocket-wheels $g'$ $g'$ are mounted on the shaft I at the free end of the frame H. The measuring-buckets J, which may be of any required capacity, but which are half-bushel, have lateral arms $j$, by means of which they are suspended from the carrier-chains G, the said arms passing through links of the said chains and having anti-friction rollers $k$ on their outer ends, which travel in grooved rails K, attached to the said frame H. The delivery-spout L is attached to and supported by the frame H.

The apparatus is designed to be attached to a thrashing or separating machine in the most convenient manner and is driven from a convenient part of the operating mechanism of the said machine, the carrier-chains being set in motion, the measuring-buckets travel filled with grain from the separating or thrashing machine upward and dump their load into the spout, which is carried by the said elevator-frame L. The sacks being applied to the spout, receive the grain and are attached thereto by means of the hooks $l$.

Having thus described my invention, what I claim, and desire to secure by Letters Patent, is—

1. In a grain elevating and measuring machine, the combination, with a base, a vertical shaft D, means for rotating the said shaft D, the frame C, mounted upon, supported by, and adapted to turn horizontally on the shaft D, the elevator-frame having pivotal connection with the frame C and adapted to turn horizontally therewith and having an independent vertical adjustment at its free end, the carrier-chains, and mechanism, substantially as herein shown, connecting and operating the said carrier-chains from the shaft D, substantially as and for the purpose described.

2. In a grain elevating and measuring machine, the combination, with a base, a vertical shaft D, means for operating said shaft, the frame C, mounted on shaft D and adapted to turn thereon, shaft E, operated from shaft D, a clutch to throw shaft E in and out of gear with shaft D, shaft F, parallel with and receiving its motion from the shaft E, the elevator-frame having connection with frame C to turn laterally therewith and adapted to have a vertical adjustment at its free end, and the carrier-chains supported at one end on the shaft F and receiving motion therefrom, substantially as described.

3. A grain elevating and measuring machine consisting of base A, vertical shaft D, means for actuating shaft D, frame C, mounted on shaft D and adapted to turn thereon, the elevator-frame pivotally connected to frame C and having grooved side rails K, the carrier-chains, the measuring-buckets having journals $j$, which obtain bearings in links of the carrier-chains and which have rollers $k$ to travel in the grooves of the rails K, and means for actuating the carrier-chains from the said shaft D, substantially as set forth.

In testimony whereof I affix my signature in presence of two witnesses.

SIMON PETER FORD.

Witnesses:
PERRY C. RUBLE,
ANDREW W. MILLER.